US008838370B2

(12) United States Patent
Wolfe

(10) Patent No.: US 8,838,370 B2
(45) Date of Patent: Sep. 16, 2014

(54) TRAFFIC FLOW MODEL TO PROVIDE TRAFFIC FLOW INFORMATION

(75) Inventor: Andrew Wolfe, Los Gatos, CA (US)

(73) Assignee: Empire Technology Development LLC, Wilmington, DE (US)

( * ) Notice: Subject to any disclaimer, the term of this patent is extended or adjusted under 35 U.S.C. 154(b) by 1090 days.

(21) Appl. No.: 12/400,631

(22) Filed: Mar. 9, 2009

(65) Prior Publication Data

US 2010/0228467 A1   Sep. 9, 2010

(51) Int. Cl.
*G08G 1/00*    (2006.01)
*G08G 1/01*    (2006.01)
*G08G 1/0968*  (2006.01)

(52) U.S. Cl.
CPC ............ *G08G 1/096811* (2013.01); *G08G 1/01* (2013.01)
USPC .............................. 701/209; 701/117; 701/118

(58) Field of Classification Search
CPC .................. G08G 1/096811; G08G 1/096827; G08G 1/096861
USPC ......... 701/117–211; 250/336.1, 359.1, 360.1; 705/13
See application file for complete search history.

(56) References Cited

U.S. PATENT DOCUMENTS

| 3,876,973 | A  | * | 4/1975  | Griebel          | 340/928 |
| 6,487,501 | B1 | * | 11/2002 | Jeon             | 701/301 |
| 6,490,519 | B1 | * | 12/2002 | Lapidot et al.   | 701/117 |
| 6,753,902 | B1 | * | 6/2004  | Kashiwazaki      | 348/119 |
| 7,072,764 | B2 | * | 7/2006  | Donath et al.    | 701/532 |
| 7,085,633 | B2 | * | 8/2006  | Nishira et al.   | 701/36  |
| 7,295,925 | B2 | * | 11/2007 | Breed et al.     | 701/301 |
| 7,603,215 | B2 | * | 10/2009 | Matsumoto et al. | 701/41  |
| 2003/0069683 | A1 | * | 4/2003 | Lapidot et al.   | 701/117 |
| 2005/0125125 | A1 | * | 6/2005 | Matsumoto et al. | 701/41  |
| 2006/0081782 | A1 | * | 4/2006 | Guillebaud et al. | 250/360.1 |
| 2006/0138331 | A1 | * | 6/2006 | Guillebaud et al. | 250/359.1 |
| 2006/0155427 | A1 | * | 7/2006 | Yang             | 701/1   |
| 2007/0233386 | A1 | * | 10/2007 | Saito et al.    | 701/300 |
| 2008/0023631 | A1 | * | 1/2008 | Majors et al.    | 250/336.1 |
| 2008/0071465 | A1 | * | 3/2008 | Chapman et al.   | 701/117 |
| 2008/0162036 | A1 | * | 7/2008 | Breed            | 701/207 |
| 2008/0208448 | A1 | * | 8/2008 | Geelen et al.    | 701/201 |
| 2009/0171772 | A1 | * | 7/2009 | Petrisor et al.  | 705/13  |
| 2011/0022302 | A1 | * | 1/2011 | Machino          | 701/201 |

FOREIGN PATENT DOCUMENTS

EP   0902405 A2   3/1999

OTHER PUBLICATIONS

Dash: The Only Internet Connected Automotive GPS, Dash Website Information, earliest copyright 2008, accessed on Mar. 9, 2009, available at http://www.dash.net and related links, Sunnyvale, CA, U.S.A.
Papageorgiou, M., Concise Encyclopedia of Traffic & Transportation Systems, Dec. 31, 1999, p. 312-314, 463-464, Pergamon Press, The Netherlands.

* cited by examiner

*Primary Examiner* — Hiep V Nguyen
*Assistant Examiner* — Teresa Woods
(74) *Attorney, Agent, or Firm* — The Juhasz Law Firm

(57) ABSTRACT

Examples of maintaining or querying a traffic database to generate a traffic flow model to provide traffic flow information and determine a per-lane route for a vehicle to travel are disclosed.

31 Claims, 12 Drawing Sheets

Query Format 500

| Start 510 | End 520 | Vehicle Type 530 | Passenger Info 540 | Capabilities 550 | Special Allowances 560 | Time 570 |

FIG. 5

Table 600
Northbound Road Segment 605

| Characteristics | Traffic Lane 605a | Traffic Lane 605b | Traffic Lane 605c |
|---|---|---|---|
| Fixed 610 | Left Lane | Middle Lane | Right Lane |
| Fixed 615 | HOV | Truck passing only | Open to all vehicle types |
| Fixed 620 | 65 mph speed limit | Trucks with trailer - 60 mph speed limit | Trucks with trailer - 60 mph speed limit |
| Fixed 625 | Congestion 7am-9am Congestion 3pm-6pm | Congestion 7am-9am Congestion 3pm-6pm | Congestion 7am-9am Congestion 3pm-6pm |
| Fixed 630 | Unrestricted HOV 7pm-7am Low Emission Exception No hazardous cargo 15 foot height limit | No hazardous cargo 15 foot height limit | No hazardous cargo 15 foot height limit |
| Fixed 635 | On-Ramp (via Lane 605c) | On-Ramp (via Lane 605c) | On-Ramp |
| Fixed 640 | Left Hand Turn at Traffic Light | Through Traffic Light | Through Traffic Light |
| Periodic 645 | Incoming Delay | Incoming Delay | Incoming Delay |
| Periodic 650 | Outgoing Delay | Outgoing Delay | Outgoing Delay |
| Periodic 655 | Road Sensor Data | Road Sensor Data | Road Sensor Data |
| Periodic 660 | Traffic Lane Alerts | Traffic Lane Alerts | Traffic Lane Alerts |
| Periodic 665 | Reports from vehicles | Reports from vehicles | Reports from vehicles |

FIG. 6

Traffic Flow Model 700

| Traffic Lane | Travel Restrictions | Speed Limit MPH | Sensor Data MPH | Traffic Lane Alert | Reports MPH | Poss. Congest | In Delay (minutes) | Out Delay (minutes) | Est. Travel (minutes) |
|---|---|---|---|---|---|---|---|---|---|
| 605a | YES | 65 | 60 | NO | 60 | YES | 5 | 7 | 20 |
| 605b | NO | 65 | 45 | NO | 40 | YES | 5 | 4 | 25 |
| 605c | NO | 65 | 10 | YES | 15 | YES | 5 | 4 | 40 |

FIG. 7A

Program Code 710

```
If (traffic_lane == non_HOV)
        Check time of query;
        Indicate speed restriction;
        Indicate speed sensor data;
        Indicate traffic lane alerts;
        Indicate reports from vehicles;
        Indicate incoming transition point delay;
        Indicate outgoing transition point delay;
        Indicate estimated travel time;
        If (time_of_query == congestion_time)
                Indicate possible congestion.
                Else if (time_of_query == non_congestion_time)
                        Indicate congestion unlikely.
    Else if (traffic_lane == HOV)
        Check passenger information;
        If (passenger_information == yes)
                Check time of query;
                Indicate speed restriction;
                Indicate speed sensor data;
                Indicate traffic lane alerts;
                Indicate reports from vehicles;
                Indicate incoming transition point delay;
                Indicate outgoing transition point delay;
                Indicate estimated travel time;
                If (time_of_query == congestion_time)
                        Indicate possible congestion.
                Else if (time_of_query == non_congestion_time)
                        Indicate congestion unlikely.
    Else if (passenger_information == no)
                Check traffic lane special allowance for low emission
                exception;
                If (vehicle_special_allowance == low_emission)
                        Check time of query;
                        Indicate speed restriction;
                        Indicate speed sensor data;
                        Indicate traffic lane alerts;
                        Indicate reports from vehicles;
                        Indicate incoming transition point delay;
                        Indicate outgoing transition point delay;
                        Indicate estimated travel time;
                        If (time_of_query == congestion_time)
                                Indicate possible congestion.
                        Else if (time_of_query == non_congestion_time)
                                Indicate congestion unlikely.
```

FIG. 7B

Program Code 710 (continued)

```
Else if (vehicle_special_allowance == non_low_emission)
    Check traffic lane special allowance restriction time;
    Check time of query;
    If (time_of_query == restriction_time)
        Indicate traffic lane is restricted for traveling.
    Else if (time_of_query == non_restriction_time)
        Indicate speed restriction;
        Indicate speed sensor data;
        Indicate traffic lane alerts;
        Indicate reports from vehicles;
        Indicate incoming transition point delay;
        Indicate outgoing transition point delay;
        Indicate estimated travel time;
        If (time_of_query == congestion_time)
            Indicate possible congestion.
        Else if (time_of_query == non_congestion_time)
            Indicate congestion unlikely.
```

FIG. 7C

1100 A computer program product.

1102 A signal bearing medium.

1104 instructions for presenting a per-lane route for a vehicle to travel, which, when executed by a computer, causes the computer to:
  query a traffic database, the query to include providing information to include an indication of a start location and an end location for a vehicle to travel and to include an indication of a vehicle type, the traffic database to include traffic lane characteristics associated with a route between the start location and the end location;
  receive traffic flow information from the traffic database, wherein the traffic flow information is generated by the traffic database responsive to the database query using a traffic flow model, and the traffic lane characteristics to provide the traffic flow information for the route between the start location and the end location;
  determine a per-lane route for the vehicle to travel in response to receiving the traffic flow information; or
  present the per-lane route for the vehicle to travel to an occupant of the vehicle.

| 1106 a computer-readable medium. | 1108 a recordable medium. | 1110 a communications medium. |

FIG. 11

TRAFFIC FLOW MODEL TO PROVIDE TRAFFIC FLOW INFORMATION

BACKGROUND

Unless otherwise indicated herein, the approaches described in this section are not prior art to the claims in this application and are not admitted to be prior art by inclusion in this section.

Traffic flow information may be used to predict travel times along various prospective or potential vehicle routes. The traffic flow information may be incorporated into a route recommendation algorithm of a Global Positioning System (GPS) based navigation and mapping system to recommend a route for a vehicle to travel. Traffic flow information, for example, can be gathered from various sources such as in-road speed sensors, cameras, and other types of fixed measurement devices or reported from individual vehicles as they travel. The accuracy of predicted travel times may be an important factor for vehicles to determine which route to travel.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 5 illustrates an example query format for a query to a traffic database;

FIG. 6 illustrates a table to depict example traffic lane characteristics maintained in a traffic database;

FIG. 7A illustrates an example traffic flow model;

FIG. 7B illustrates a portion of an example program code to generate the traffic flow model;

FIG. 7C illustrates another portion of the example program code to generate the traffic flow model;

FIG. 11 illustrates a block diagram of an example computer program product

DETAILED DESCRIPTION

Figure 1:
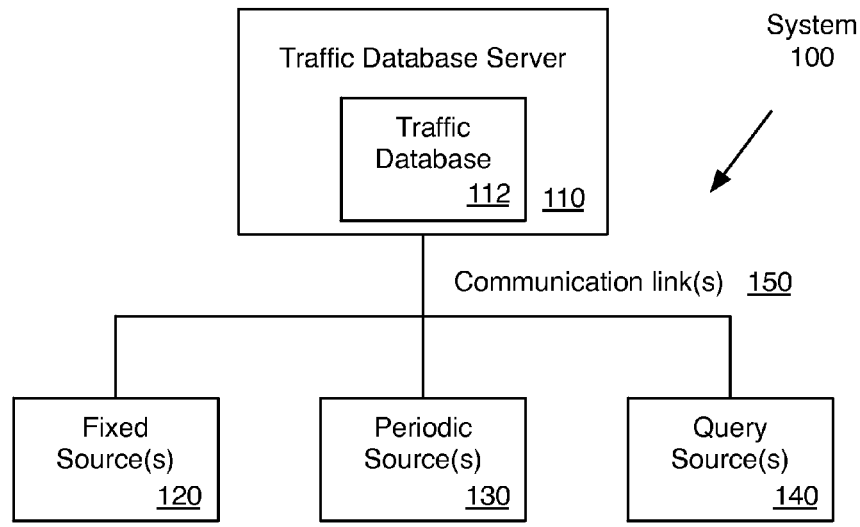
FIG. 1 illustrates a block diagram of an example of a traffic flow information system.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products related to maintaining and/or querying a traffic database to generate a traffic flow model. The traffic flow model, for example, may provide traffic flow information. The traffic flow information, for example, may be used to determine a per-lane route for a vehicle to travel.

As contemplated by the present disclosure, the accuracy of predicted travel times may be an important factor for vehicles to determine which route to travel. However, gathered traffic flow information should account for traffic lane characteristics associated with modern highways and urban traffic grids. For example, an interstate highway with a road segment passing through and near a large city such as Los Angeles may include a high occupancy vehicle (HOV) traffic lane. An HOV traffic lane may be reserved for vehicles with a driver and one or more passengers, buses, motorcycles or low-emission vehicles. The HOV traffic lane and other traffic lanes of this road segment may also restrict trucks with or without trailers from using these lanes. The restrictions may be all day or limited to peak traffic hours. Meanwhile, the far-right lanes of the road segment may be open to all types of vehicles.

In another example, other road segments associated with roadways passing in and through an urban area may have characteristics that change throughout a business day or on a weekend. A wait at a typical traffic light in morning rush hour traffic may be a few minutes, but the time needed to make a left hand turn may be several times longer. A traffic flow model that provides traffic flow information should possibly account for the examples mentioned above to predict accurate travel times along various prospective or potential vehicle routes. In some examples, as described below, a prospective or potential vehicle route may include a per-lane route.

In some examples, a query is placed to a traffic database. The query may include providing information to include an indication of a start location and an end location for a vehicle to travel and also may include an indication of a vehicle type (e.g., car, truck, bus, motorcycle, etc.). In these examples, the traffic database includes traffic lane characteristics associated with a route between the start location and the end location indicated in the query. A traffic flow model that is based on the query information and the traffic lane characteristics may then be generated to provide traffic flow information for the route between the start location and the end location. This traffic flow information may be used to determine a per-lane route for the vehicle to travel. The per-lane route, for example, includes a path through one or more road segments FIG. 1 illustrates a block diagram of an example traffic flow information system 100. In some examples, as depicted in FIG. 1, system 100 includes traffic database server 110, fixed source(s) 120, periodic source(s) 130, query source(s) 140 and communication link(s) 150. Also shown in FIG. 1, is a traffic database 112. Traffic database 112, for example, is located with or resident on traffic database server 110. As described more below, logic located with or resident on traffic database server 110 may maintain traffic database 112. Traffic database 112 may include traffic lane characteristics for one or more road segments located within a geographical location or a map area. The logic may also respond to queries received from a query source (e.g., query source(s) 140). The response may include providing traffic lane characteristics associated with the received query.

In some examples, traffic database server 110 is coupled to other elements of system 100 via communication link(s) 150. Communication link(s) 150, for example, may include one or more types of communication links to communicatively couple elements of system 100. These types of communication links may include wired or wireless communication mediums that couple to a network. The network may include, but is not limited to, a wired or wireless local area network (LAN/WLAN), a wide area network (WAN/WWAN), a metropolitan area network (MAN), a personal area network (PAN), a cellular or wireless broadband telephony network and a satellite network.

In some examples, fixed source(s) 120 provides (e.g., via communication link(s) 150) substantially fixed information to traffic database server 110. This substantially fixed information, for example, is added to or updates traffic characteristics maintained in traffic database 112. Substantially fixed information may change infrequently, e.g., weekly, monthly or yearly.

In some examples, substantially fixed information may include a number of traffic lanes for a given direction of movement or traffic lane restriction information for respective traffic lanes. Restriction information may include, but is not limited to, HOV, weight limits, height limits, noise limits, speed limits, seasonal restrictions (e.g., tire-traction or chains required, four-wheel drive, winter closure, etc.), and hazardous cargo prohibitions. Substantially fixed information may also include, times a restriction is enforced, type of road surface (paved, gravel, dirt, unimproved, etc.), road classification (interstate, state highway, expressway, collector, arterial, residential, etc.) or typical congestion times (e.g., rush hour or days before/after holidays), incoming/outgoing transition points, although this disclosure is not limited to only the above listed types of substantially fixed information.

In some examples, fixed source(s) 120 may include federal, state and local government agencies. Federal/state transportation laws or statutes as well as local ordinances, for example, may also be included in fixed source(s) 120. Additionally, fixed source(s) 120 may include private sources such as mapping or navigation services that maintain navigable digital map databases or other types of map databases.

In some examples, periodic source(s) 130 provides (e.g., via communication link(s) 150) periodically updated information to traffic database 110. This periodically updated information may be added to or may update traffic characteristics maintained in traffic database 112. Periodically updated information may change frequently (e.g., real-time or near real-time, by-the-minute, hourly or daily) and may include road sensor data (e.g., speed sensors), accident/construction reports and traffic flow data reported from individual vehicles as they travel on or have recently traveled through a road segment, although this disclosure is not limited to only the above listed types of periodically updated information.

Periodic source(s) 130 may include federal, state and local government agencies that gather real-time or near real-time data using, for example, road sensors, traffic cameras, construction/accident reports and traffic flow reporting from public service vehicles. Periodic source(s) 130 may also include private or proprietary services. These private services may manage traffic reporting networks that gather real-time or near real-time traffic flow data. The real-time data, for example, includes reports from vehicles over the traffic-reporting network or via other types of networks.

In some examples, query source(s) 140 represents the source of queries made to traffic database server 110 (e.g., via communication link(s) 150). Query source(s) 140, for example, may seek traffic lane characteristics and/or traffic flow information between a start location and an end location for a vehicle to travel. Query source(s) 140 could be the vehicle's navigation system, a central dispatcher for the vehicle or a provider of a navigation service to the vehicle, although the disclosure is not limited to only these examples.

In some examples, as described more below, logic located with or resident at query source(s) 140 may place a query to traffic database 112. The query, for example, to include a vehicle's characteristics and include information to indicate a start location and an end location for the vehicle to travel. The query may also include an indication of a vehicle type (e.g., car, truck, bus, motorcycle, etc.) and possibly other vehicle characteristic information. In these examples, a traffic flow model may be generated based on traffic lane characteristics associated with a route between the start location and the end location and the information included in the query (query information). The traffic flow model, as described more below, may be generated by logic located with or resident at query source(s) 140 or located with or resident at traffic database server 110. The generated traffic flow model, for example, may then be used to provide traffic flow information for the route between the start location and the end location.

In some examples, logic located with or resident at query source(s) 140 determines a per-lane route that may include a path through one or more road segments for the vehicle to travel. In these examples, the per-lane route may be determined in response to receiving or obtaining the traffic flow information for the route between the start location and the end location. The per-lane route for the vehicle to travel may then be presented to an occupant of the vehicle, e.g., displayed on a vehicle's navigation display or provided verbally on a turn-by-turn basis.

Figure 2:
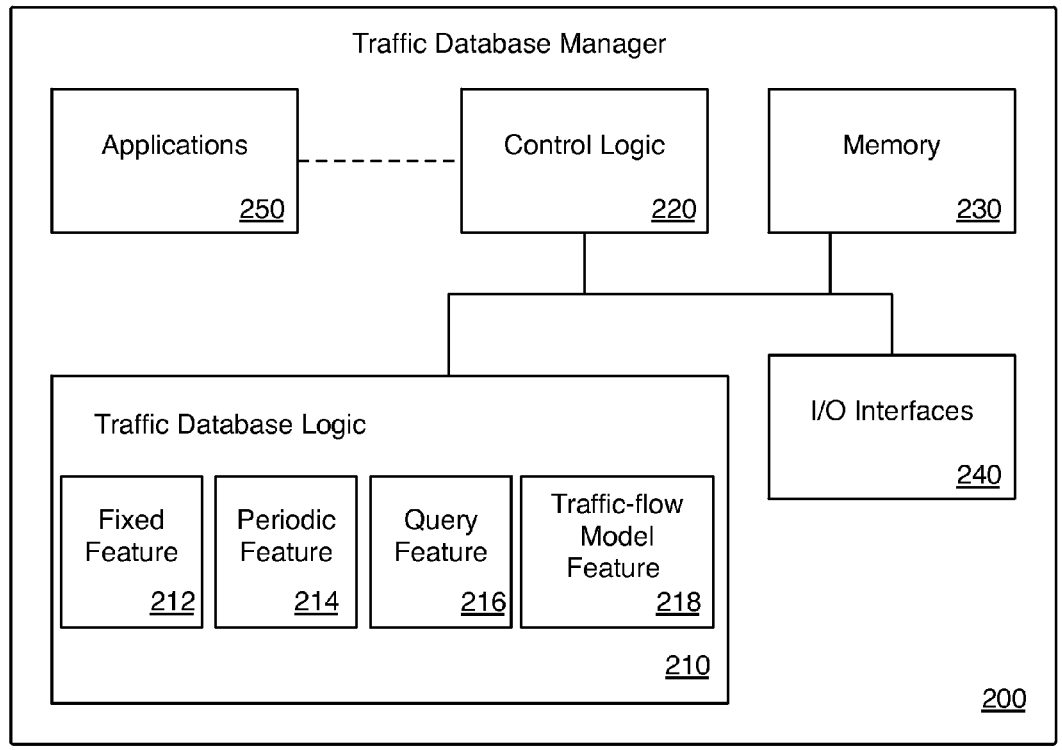
FIG. 2 illustrates a block diagram of an example traffic database manager architecture.

FIG. 2 illustrates a block diagram of an example traffic database manager 200 architecture. In FIG. 2, traffic database manager 200's example architecture includes traffic database logic 210, control logic 220, memory 230, input/output (I/O) interfaces 240 and optionally one or more applications 250. As illustrated in FIG. 2, traffic database logic 210 is coupled to control logic 220, memory 230 and I/O interfaces 240. Also illustrated in FIG. 2, the optional applications 250 are arranged in cooperation with control logic 220. Traffic database logic 210 may further include one or more of a fixed feature 212, a periodic feature 214, a query feature 216 and a traffic-flow module feature 218, or any reasonable combination thereof.

In some examples, the elements portrayed in FIG. 2's block diagram are those elements to support or enable traffic database manager 200 as described in this disclosure, although a given traffic database manager may include some, all or more elements than those depicted in FIG. 2. For example, traffic database logic 210 and control logic 220 may each or collectively represent a wide variety of logic device(s) to implement the features of traffic database manager 200. A logic device, for example, may include a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 2, traffic database logic 210 includes fixed feature 212, periodic feature 214, query feature 216 and traffic flow model feature 218. Traffic database logic 210 may be configured to use one or more of these features to perform several operations. Example operations may include one or more of maintaining traffic database 112 by receiving or obtaining substantially fixed and periodically updated information or responding to a query received from a query source (e.g., query source(s) 140). The operations may also include generating a traffic flow model to provide traffic flow information based on information obtained from traffic database 112 and/or query information received from the query source.

In some examples, control logic 220 may be configured to control the overall operation of traffic database manager 200. As mentioned above, control logic 220 may represent any of a wide variety of logic device(s) configured to operate in conjunction with executable content or instructions to implement the control of traffic database manager 200. In alternate examples, the features and functionality of control logic 220 may be implemented within traffic database logic 210.

According to some examples, memory 230 is arranged to store executable content or instructions. The executable content or instructions may be used by control logic 220 and/or traffic database logic 210 to implement or activate features or elements of traffic database manager 200. Memory 230 may also temporarily maintain traffic lane characteristics obtained by traffic database logic 210's features in response to a query to traffic database 112. Memory 230 may also temporarily maintain query information and the traffic lane characteristics to generate a traffic flow model to provide traffic flow information to the source of the query (e.g., query source(s) 140).

Memory 230, for example, may include a wide variety of memory media including, but not limited to, volatile memory, non-volatile memory, flash, programmable variables or states, random access memory (RAM), read-only memory (ROM), or other static or dynamic storage media.

In some examples, I/O interfaces 240 may provide an interface via an internal communication medium or link (not shown) between traffic database manager 200 and elements resident on or located with traffic database server 110. I/O interfaces 240, for example, include interfaces that may operate according to various communication protocols to communicate over the internal communication link (e.g., Inter-Integrated Circuit (I$^2$C), System Management Bus (SMBus) or Serial Peripheral Interface Bus (SPI), etc.). I/O interfaces 240 may also provide an interface between traffic database manager 200 and elements remote to traffic database server 110. As mentioned above for FIG. 1, traffic database server 110 may couple to elements of system 100 via communication link(s) 150. I/O interfaces 240, for example, include an interface that operates according to various communication protocols to allow traffic database manager 200 to communicate over communication link(s) 150 (e.g., Code Division Multiple Access 2000 (CDMA2000), Global System for Mobile Communications (GSM), Ethernet, Asynchronous Transfer Mode (ATM), Synchronous Optical Networking (SONET), etc.).

In some examples, traffic database manager 200 includes one or more applications 250 to provide instructions to control logic 220 and/or traffic database logic 210.

Figure 3:
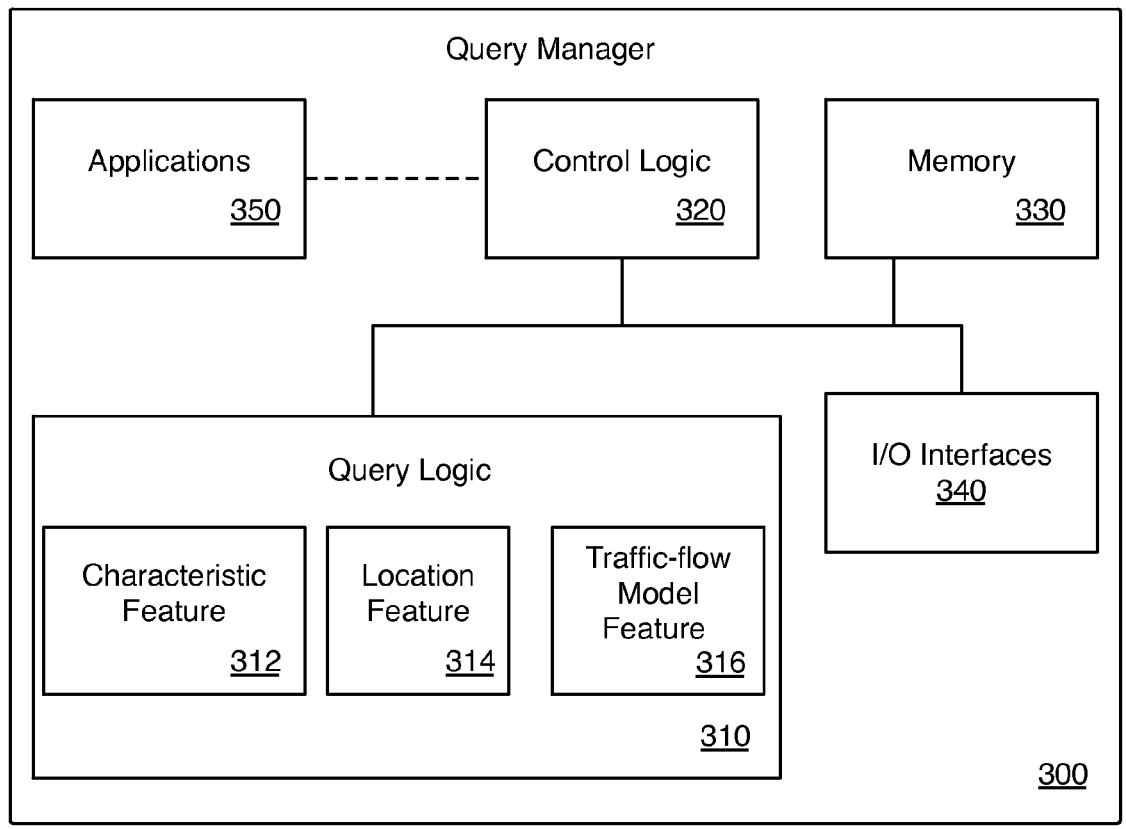
FIG. 3 illustrates an example block diagram of a query manager architecture.

FIG. 3 illustrates an example block diagram of a query manager 300 architecture. In FIG. 3, query manager 300's example architecture includes query logic 310, control logic 320, memory 330, input/output (I/O) interfaces 340 and optionally one or more applications 350. As illustrated in FIG. 3, query logic 310 is coupled to control logic 320, memory 330 and I/O interfaces 340. Also illustrated in FIG. 3, the optional applications 350 are arranged in cooperation with control logic 320. Query logic 310 may further include a characteristic feature 312, location feature 314 and traffic-flow module feature 316.

In some examples, the elements portrayed in FIG. 3's block diagram are those elements to support or enable query manager 300 as described in this disclosure, although a given query manager may include some, all or more elements than those depicted in FIG. 3. For example, query logic 310 and control logic 320 may each or collectively represent a wide variety of logic device(s) to implement the features of query manager 300. As mentioned previously, a logic device, for example, may include a computer, a microprocessor, a microcontroller, an FPGA, an ASIC, a sequestered thread or a core of a multi-core/multi-threaded microprocessor or a combination thereof.

In some examples, as shown in FIG. 3, query logic 310 includes characteristic feature 312, location feature 314 and traffic flow model feature 316. Query logic 310 may be configured to use these features to perform several operations. Example operations may include placing a query to a traffic database (e.g., traffic database 112), the query to include information to indicate a start and an end location for a vehicle to travel and to also indicate one or more characteristics of the vehicle. The operations may also include generating a traffic flow model to provide traffic flow information to the vehicle. The traffic flow model, for example, is based on traffic lane characteristics obtained from the traffic database and the query information.

In one example, control logic 320 may control the overall operation of query manager 300 and as mentioned above, may represent any of a wide variety of logic device(s) configured to operate in conjunction with executable content or instructions to implement the control of query manager 300. In alternate examples, the features and functionality of control logic 320 may be implemented within query logic 310.

Similar to memory 230, described above, memory 330 may include a wide variety of memory media. According to some examples, memory 330 is arranged to store executable content or instructions. The executable content or instructions may be used by control logic 320 and/or query logic 310 to implement or activate features or elements of query manager 300. Memory 330 may also temporarily maintain traffic lane characteristics obtained or received by query logic 310's features in response to a query to a traffic database. Memory 330 may also be arranged to temporarily maintain the query information and the traffic lane characteristics to enable query logic 310's features to generate a traffic flow model. The traffic flow model, for example, may be at least temporarily maintained in memory 330 in order to provide traffic flow information for a determination of a per-lane route for a vehicle to travel.

Similar to I/O interfaces 240, described above, I/O interfaces 340 may provide an interface via an internal communication medium or link (not shown) between query manager 300 and elements resident on or located with query source(s) 140. I/O interfaces 340 may also provide an interface between query manager 300 and elements remote to query source(s) 140.

In some examples, query manager 300 includes one or more applications 350 to provide instructions to control logic 320 and/or query logic 310.

Figure 4:
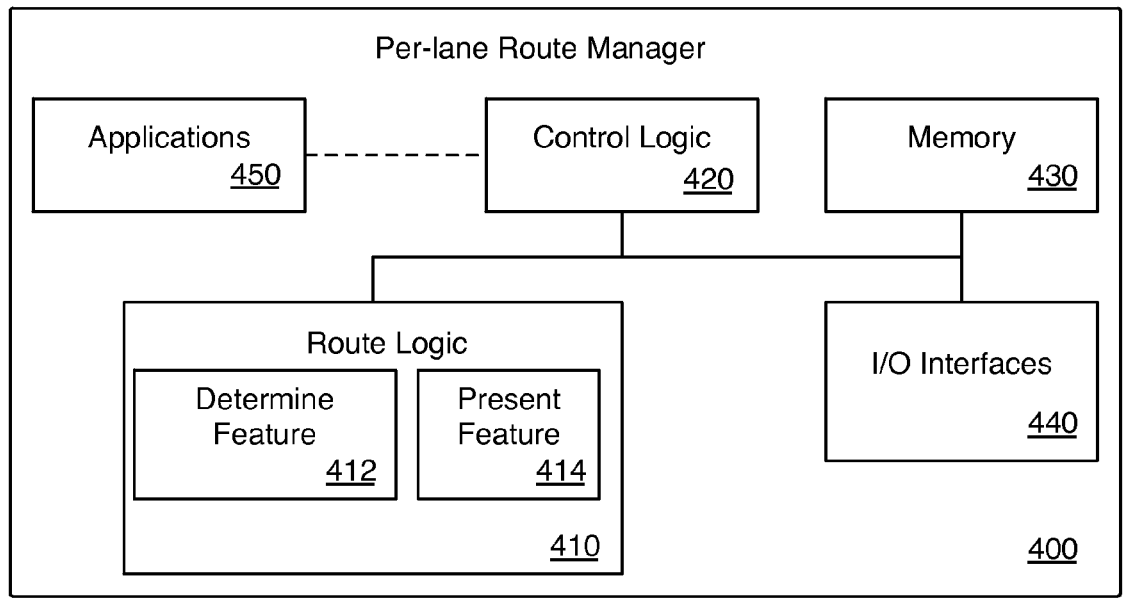
FIG. 4 illustrates an example block diagram of a per-lane route manager architecture.

FIG. 4 illustrates an example block diagram of a per-lane route manager 400 architecture. In FIG. 4, per-lane route manager 400's example architecture includes route logic 410, control logic 420, memory 430, input/output (I/O) interfaces 440 and optionally one or more applications 450. As illustrated in FIG. 4, route logic 410 is coupled to control logic 420, memory 430 and I/O interfaces 440. Also illustrated in FIG. 4, the optional applications 450 are arranged in cooperation with control logic 420. Route logic 410 may further include a determine feature 412 and a present feature 414.

In some examples, the elements portrayed in FIG. 4's block diagram are those elements to support or enable per-lane route manager 400 as described in this disclosure, although a given per-lane route manager may include some, all or more elements than those depicted in FIG. 4. For example, route logic 410 and control logic 420 may each or collectively represent a wide variety of logic device(s) to implement the features of per-lane route manager 400. A logic device, for example, may include a computer, a microprocessor, a microcontroller, an FPGA, an ASIC, a sequestered thread or a core of a multi-core/multi-threaded microprocessor or a combination thereof.

In some examples, as shown in FIG. 4, route logic 410 includes determination feature 412 and present feature 414. In some examples, route logic 410 may be configured to use these features to perform several operations. Example operations may include determining a per-lane route for a vehicle to travel in response to receiving or obtaining traffic flow information. The operations may also include providing or presenting the per-lane route for the vehicle to travel to an occupant of the vehicle.

In some examples, control logic 420 may control the overall operation of route manager 400 and as mentioned above, may represent any of a wide variety of logic device(s) configured to operate in conjunction with executable content or instructions to implement the control of route manager 400. In alternate examples, the features and functionality of control logic 420 may be implemented within route logic 410.

Similar to memory 230, described above, memory 430 may include a wide variety of memory media. According to some examples, memory 430 is arranged to store executable content or instructions. The executable content or instructions may be used by control logic 420 and/or route logic 410 to implement or activate features or elements of route manager 400. Memory 430 may also temporarily maintain traffic flow information for a vehicle obtained by route logic 410's features in response to receiving the traffic flow information, e.g., from query manager 300. Memory 430 may also temporarily maintain a per-lane route for the vehicle to travel in order to provide the per-lane route to an occupant of the vehicle.

Similar to I/O interfaces 240, described above, I/O interfaces 440 may provide an interface via an internal communication medium or link (not shown) between route manager 400 and elements resident on or located with query source(s) 140. I/O interfaces 440 may also provide an interface between route manager 400 and elements remote to query source(s) 140.

In some examples, route manager 400 includes one or more applications 450 to provide instructions to control logic 420 and/or route logic 410.

FIG. 5 illustrates an example query format 500 to depict how query information may be conveyed in a query to a traffic database (e.g., traffic database 112). In some examples, query format 500 includes fields 510, 520, 530, 540, 550 and 560. These fields, for example, include at least a portion of the query information for the query to the traffic database. As described more below, a traffic flow model may be generated based on the query information and traffic lane characteristics obtained from the traffic database. The traffic flow model may then be used to provide traffic flow information to the source of the query information.

Fields 510 and 520 may indicate start and end location information, respectively. The start location included in field 510 may indicate the starting point for a vehicle to travel. This starting point, for example, may indicate the location of the vehicle at or near the time the query is made. Start location information, for example, includes, but is not limited to, geophysical location information obtained through a GPS receiver or other type of locating device. Start location information may also include location information obtained from a map or an address book. The end location included in field 520 may indicate the final or desired destination of the vehicle. End location information, for example, includes, but is not limited to, map grid coordinates, street addresses, road intersections, points of interest, cities, towns, parks and neighborhoods.

In some examples, a query may not need an explicit start point in the query to indicate a start location. Rather, the start location may be indicated in other ways. For example, logic maintained at or with a traffic database (e.g., traffic database logic 210) may be configured to determine the start location associated with the query. This determination may be based on location characteristics associated with how the query was conveyed to the traffic database via communication link(s) 150. For example, if communication link(s) 150 included a wireless communication link and the source of the query was located at or with a vehicle, the network that enabled the wireless communication to convey the query may also track the location of where the source of the query originated. The tracking information may then be added to the query in indicate the start location. In other examples, the location of the query may be presumed close enough to the point of entry in the network (e.g., a wireless access point) so that the location of the access point itself can serve as a default start location.

Field 530, for example, indicates a vehicle type. The vehicle type includes, but is not limited to, cars, trucks, buses or motorcycles. Field 540 may include information to indicate whether the vehicle contains or will contain passengers. Field 550, for example, includes information to indicate capabilities of the vehicle. Capabilities may include, but are not limited to, two-wheel drive, four-wheel drive, tire-traction capable, height clearance and turning radius. Field 560, for example, includes information to indicate applicable special allowances. In some examples, special allowances may indicate that a vehicle is a low emission vehicle (e.g., electric, hybrid, etc.) or an alternative fuel vehicle (e.g., bio-fuels such as ethanol or bio-diesel). In other examples, special allowances may indicate that a vehicle is transporting hazardous cargo such as explosives or toxic chemicals. Field 570 may include the time of the query or may indicate the time the vehicle plans or anticipates traveling from the start location to the end location.

FIG. 6 illustrates a table 600 to depict example traffic lane characteristics maintained in a traffic database (e.g., traffic database 112). In some examples, the contents of table 600 may be maintained by traffic database manager 200 and may be used along with query information to generate a traffic flow model in order to provide traffic flow information to the source of the query. In some examples, as depicted in FIG. 6, traffic lane characteristics for northbound road segment 605 include fixed characteristics 610, 615, 620, 625, 630, 635, 640 and include periodic characteristics 645, 650, 655, 660 and 665 for each of three traffic lanes 605a, 605b and 605c. Northbound road segment 605 may be an example of a portion of an expressway or highway. The outgoing transition point for northbound road segment 605 may be the end of the expressway or a portion of the expressway or highway that enters an area with traffic lights and reduced speed limits.

Table 600 is provided as an example of possible contents of a traffic database for a road segment. The number of lanes for the road segment and associated fixed/periodic characteristics may include any number of lanes and/or associated fixed/periodic characteristics. Although not shown, a similar table may exist for a southbound road segment 605. Also, traffic lane characteristics for any number of road segments, for example, can be maintained in the traffic database.

In some examples, fixed characteristics 610, 615, 620, 625, 630, 635 and 640 may be based on substantially fixed information and as mentioned above, may change infrequently. In some embodiments, as shown in FIG. 6, fixed characteristics 610, 615, 620, 625, 630, 635 and 645 include traffic lane characteristics associated with traffic lanes 605*a-c*. Fixed characteristic 610 may includes lane position information. Fixed characteristic 615 and 620 may include lane restriction information. Fixed characteristic 625 may include congestion information. Congestion information, for example, may indicate possible or likely congestion at certain times of the day based on historical traffic flow information. Congestion during typical rush hour times associated with morning and evening commutes is but one example of historical traffic flow information that may indicate congestion.

Fixed characteristic 630 may include traffic lane special allowances. As depicted in FIG. 6, the traffic lane special allowances may include unrestricted HOV traffic lane times, allowed HOV lane use for non-passenger, low emission vehicles and travel prohibition on all lanes for vehicles transporting hazardous cargo or exceeding a given height (e.g., for a route segment through a tunnel), although this disclosure is not limited to only the above listed types of special allowances.

Fixed characteristics 635 may include information to indicate an incoming transition point of northbound road segment 605. The incoming transition point may include a part of a northbound road segment 605 that connects or couples to another road segment. For example, an on-ramp may be an incoming transition point to northbound road segment 605. In this example, traffic lane 605*c* (right lane) may be the only traffic lane that has this transition point if traffic enters northbound road segment 605 via the right lane.

Fixed characteristics 640 may include information to indicate an outgoing transition point of northbound road segment 605. The outgoing transition point may include a part of a northbound road segment 605 that connects or couples to another road segment. For example, an outgoing transition point may be an intersection were northbound road segment 605 may connect or couple with one or more other road segments. The intersection may include a stop sign, traffic light, roundabout or other type of traffic control measure. Also, an outgoing transition point may include a left-hand turn at an intersection. A left-hand turn may only impact traffic lane 605*a* (left lane) and the information in fixed characteristics 640 may indicate that impact.

In some examples, periodic characteristics 645, 650, 655, 660 and 665 may be based on periodically updated information and as mentioned above, may change frequently. As shown in FIG. 6, periodic characteristics 645, 650, 655, 660 and 665 include traffic lane characteristics associated with traffic lanes 605*a-c*. Period characteristic 645 may include incoming transition point information. Incoming transition point information may indicate the amount of time or delays in passing through the incoming transition point. As previously mentioned above, northbound road segment 605 may be a highway or expressway, thus an incoming transition point may include an on-ramp. Also, although a vehicle may enter northbound road segment 605 via traffic lane 605*c*, the vehicle may have to cross traffic lane 605*c* to enter traffic lanes 605*a* and 605*b*. As a result of the vehicle needing to cros traffic lane 605*c*, the same delay times may be reported for traffic lanes 605*a-c*. Also, periodic characteristic 650 may include outgoing transition point information. Outgoing transition point information may indicate the amount of time or delays in passing through the outgoing transition point. As mentioned above, northbound road segment 605 has an outgoing transition point that marks an end or a portion of an expressway or a highway that enters an area with traffic lights and reduced speed limits. Since the outgoing transition point indicates an area where the expressway or highway passes through traffic lights, delays due to traffic light congestion or left hand turns may be indicated in periodic characteristic 650.

Periodic characteristic 655, for example, includes road sensor data or information. This road sensor data, for example, indicates real-time or near real-time traffic speeds for a particular traffic lane. The road sensor data may also include the average speeds of all or a portion of the lanes in a road segment. As shown in FIG. 6, periodic characteristic 660, for example, includes information indicating traffic lane alerts such as accidents, construction or stalled vehicles. Traffic lane alerts, in some embodiments, may indicate a possible impact on the traffic flow through a traffic lane. Periodic characteristic 665, for example, includes traffic flow data reported from vehicles that are traveling on or have recently traveled through the road segment. Traffic flow data may include, but is not limited to, speeds of the reporting vehicles, wait times at stoplights and a general description of movement (e.g., stop and go, steady speeds, relatively free movement, etc.).

FIG. 7A illustrates an example traffic flow model 700. Traffic flow model 700, for example, was generated based on a vehicle's characteristics and traffic lane characteristics associated with a prospective route for the vehicle to travel. In the example depicted in FIG. 7A, the vehicle's characteristics were obtained from query information conveyed in query format 500. As mentioned above, vehicle characteristics may indicate start and end locations for the vehicle to travel and may also indicate other vehicle characteristics such as vehicle type. The locations indicated in the query information, for example, may encompass a route that includes all or a portion of northbound road segment 605. Thus, in this example, the traffic lane characteristics associated with at least a portion of the prospective route may be included with the traffic lane characteristics maintained in a traffic database (see FIG. 6). Also, in this example, the query information indicated a car vehicle type with no passengers, no low emissions and a query time that falls within an HOV restriction time.

FIG. 7B and FIG. 7C illustrate an example program code 710 to generate traffic flow model 700. In some examples, traffic flow model 700 was generated using a traffic flow algorithm depicted as program code 710 in FIGS. 7B and 7C, although this disclosure is not limited to this example program code 710. Inputs, for example to the traffic flow algorithm that generated traffic flow model 700 were based on at least a portion of the traffic lane characteristics of traffic lanes 605*a-c* and on at least a portion of the query information conveyed in query format 500.

In some examples, logic, in either traffic database manager 200 or query manager 300 may implement or execute program code 710 for each of the three traffic lanes of road segment 605 to generate traffic flow model 700. As shown in FIG. 7A, traffic flow information for traffic lanes 605*a-c* may be provided. For example, traffic flow model 700 indicates that traffic lane 605*a* is restricted for travel by the vehicle associated with the query and that traffic lanes 605b and 605c are not restricted to the vehicle. Traffic flow model 700 also includes a traffic lane alert for traffic lane 605c. The traffic lane alert may indicate an accident, construction or a stalled vehicle in traffic lane 605c.

Traffic flow model 700 may further indicate incoming transition point delay times that are the same for traffic lanes 605a-c. As previously mentioned above for FIG. 6, the incoming transition point delay may be based on delay times to enter traffic lane 605c via an on-ramp. Also, as mentioned above, since the outgoing transition point for road segment 605 marks the end of higher speed limits and no traffic lights, traffic flow model 700 indicates separate outgoing transition point delay times for traffic lanes 605a-c. The separate outgoing transition point delays may indicate traffic light delays and/or left hand turn delays. Traffic flow model 700 may also include a separate indication of an estimated travel time for traffic lanes 605a-c. In some examples, logic, in either traffic database manager 200 or query manager 300 may be configured to determine an estimated travel time for a traffic lane based on speed sensor data, reports from vehicles and incoming/outgoing transition point delay times.

In some examples, traffic flow information in traffic flow model 700 may be used or provided to facilitate a determination of which traffic lanes in road segment 605 (if any) will be at least a part of a path included in a per-lane route for the vehicle to travel. As mentioned above, traffic flow model 700, for example, indicates that traffic lane 605a is restricted, traffic lane 605c has a traffic lane alert and the estimated travel time for traffic lane 605b is smaller than for traffic lane 605c. Thus, given the traffic flow information provided by traffic flow model 700, a determination that traffic lane 605b may be the best or fastest route through road segment 605 is likely or probable.

In some examples, a traffic flow model may be provided that includes information pertaining to traffic lanes for which a vehicle is eligible to travel. For example, since the vehicle type for the query that lead to the generation of traffic flow model 700 included no passengers, the vehicle is not eligible or restricted from traveling on traffic lane 605a. In this example, logic, in either traffic database manager 200 or query manager 300 may implement program code 710, but will exclude information related to traffic lane 605a from a generated traffic flow model.

In some examples, traffic flow model 700 may be combined with other traffic flow models for one or more other road segments to provide traffic flow information to the vehicle associated with the query. The other traffic flow models, for example, may be generated in a similar manner to how traffic flow model 700 was generated. This traffic flow information, for example, may also facilitate a determination of a path included in a per-lane route for the vehicle to travel. The path, for example, could result in the vehicle changing traffic lanes as the vehicle enters or exits locations encompassed within the other road segments.

Figure 8:
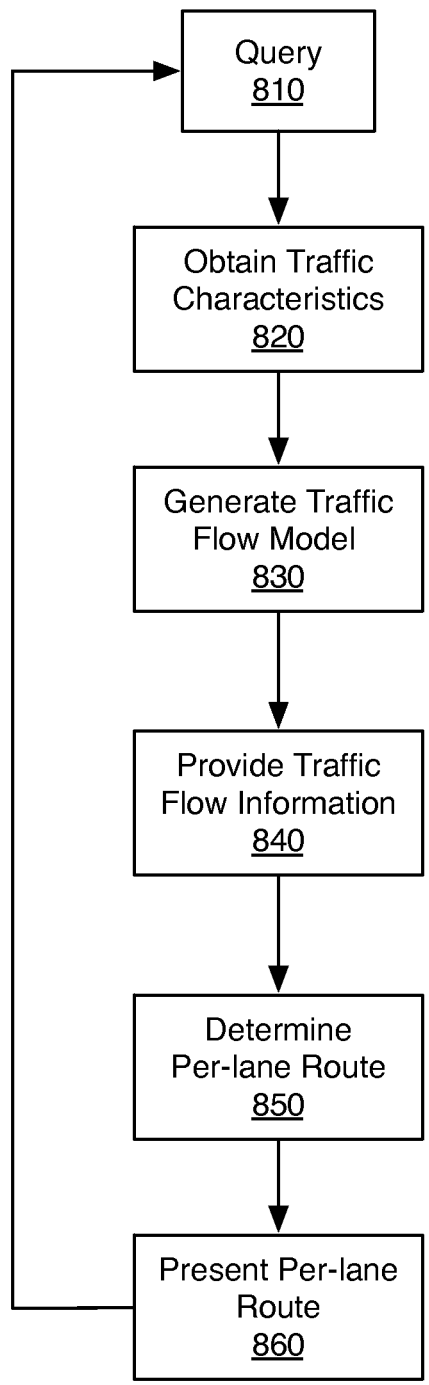
FIG. 8 illustrates a flow chart of an example method to provide traffic flow information to determine a per-lane route for a vehicle to travel.

FIG. 8 illustrates a flow chart of an example method to provide traffic flow information to determine a per-lane route for a vehicle to travel. In some examples, system 100, as described in FIG. 1, is used to describe this method, although this method is not limited to only an implementation on system 100. The method, for example, may be implemented on other systems that may include at least a portion of the elements of system 100.

Processing begins in block 810 (Query), where a query from query source(s) 140 is made to traffic database 112 maintained at traffic database server 110. This query, in some embodiments, may be in the form of query format 500 and may be provided by query manager 300 via communication link(s) 150. As mentioned above, query format 500 includes query information that may indicate characteristics for a vehicle. These vehicle characteristics, for example, may indicate a start location and an end location for the vehicle to travel as well as a vehicle type.

Processing continues from block 810 to block 820 (Obtain Traffic Characteristics), where traffic database manager 200 receives the query and obtains traffic lane characteristics associated with a route between the start location and the end location indicated in the query information. In some examples, the route includes route segment 605 as described for FIG. 6. Thus, in this example, the traffic lane characteristics depicted in FIG. 6 may be obtained from traffic database 112.

Continuing from block 820 to block 830 (Generate Traffic Flow Model), the process may generate a traffic flow model. The traffic flow model may be based on the traffic lane characteristics obtained by elements of traffic database manager 200 (e.g., traffic database logic 210). In some embodiments, the traffic flow model may be generated by elements of traffic database manager 200 (e.g., traffic database logic 210). In other embodiments, elements of query manager 300 (e.g., query logic 310) generate the traffic flow model. One or more traffic flow algorithms may be implemented to generate a traffic flow model for traffic lanes 605a-c. The one or more traffic flow algorithms may be similar to the traffic flow algorithm described above for program code 710.

Proceeding from block 830 to block 840 (Provide Traffic Flow Information), where traffic flow information for the vehicle based on the traffic flow model may be provided to the source of the query. The traffic flow information may indicate traffic flow information for each of traffic lanes 605a-c. Alternatively, the traffic flow information may include information for unrestricted traffic lanes for which the vehicle is eligible to travel. Thus, in this alternative, information for restricted traffic lane(s) is not provided.

Continuing from block 840 to block 850 (Determine Per-lane Route), the process determines a per-lane route for the vehicle to travel. The determination, for example, may be in response to receiving the traffic flow information. The traffic flow information, for example, facilitates a determination of which traffic lane or traffic lane path provides the best per-lane route (e.g., has the fastest prospective travel time) between the start location and the end location. In some embodiments, elements of per-lane route manager 400 (e.g., route logic 410) may determine the best per-lane route.

Proceeding from block 850 to block 860 (Present Per-lane Route), the process may present (e.g., via an audio or visual output) the determined per-lane route to an occupant (e.g., the driver) of the vehicle. In some embodiments, per-lane route manager 400 may be located at a query source(s) 140 that is remote to the vehicle. A per-lane route manager 400 located remotely may present the per-lane route to an occupant of the vehicle over a wired or wireless communication medium coupled to a network that includes, but is not limited to, a LAN, WLAN, WAN, WWAN, MAN, PAN, a cellular or wireless broadband telephony network and a satellite network. Remote presentation may include turn-by-turn voice guidance or may include transmitting the per-lane route for eventual display by a display system (e.g., a navigation system, a wireless phone, a handheld computer, a portable computer, etc.) located at, with or in the vehicle.

In other embodiments, per-lane route manager 400 may be located at a query source(s) 140 located at, with or in the vehicle. Presentation, in this other example, may also include turn-by-turn voice guidance or providing the per-lane route for eventual display by a display system.

In some examples, another query may be initiated due to events occurring while the vehicle is traveling the per-lane route (e.g., an accident, stalled vehicle or unexpected congestion). In these examples, the process returns to block 810 and a new per-lane route including a path through a different road segment and/or traffic lane may be determined and presented to an occupant of the vehicle.

Figure 9:
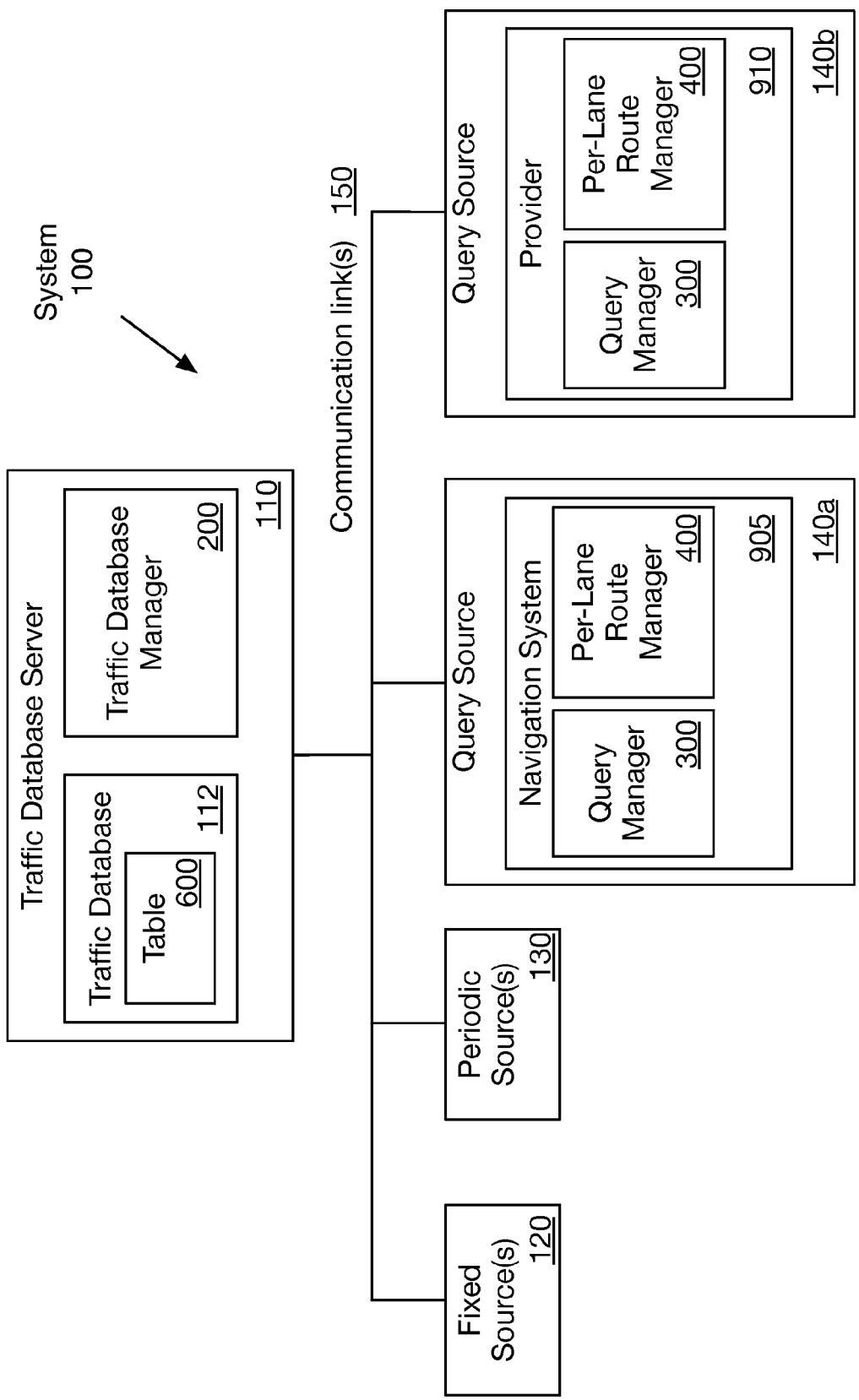
FIG. 9 illustrates a block diagram illustrating additional aspects of the example traffic flow information system.

FIG. 9 illustrates a block diagram illustrating additional aspects of the example traffic flow information system 100 depicted in FIG. 1 and described above. As shown in FIG. 9, in some embodiments, query source 140a and query source 140b provide examples of at least two types of query sources that may place a query to a traffic database such as traffic database 112.

In some examples, as shown in FIG. 9, traffic database manager 200 and table 600 may be located with or resident on traffic database server 110. As mentioned previously, traffic database manager 200 may include logic (e.g. traffic database logic 210 and/or control logic 220) to maintain traffic database 112. Traffic database 112 may include table 600 and as described above for FIG. 6, table 600 may include traffic lane characteristics for a road segment 605. The traffic lane characteristics for road segment 605 may be based on substantially fixed and periodically updated information.

In some examples, traffic database manager 200, in response to receiving a query to traffic database 112 (e.g., from query source 140a or 140b), may provide traffic lane characteristics associated with the query. The provided traffic lane characteristics may include the characteristics depicted in table 600 and may enable the generation of a traffic flow model (e.g., traffic flow model 700). The traffic flow model may provide traffic flow information to the source of the query.

In some examples, as shown in FIG. 9, query source 140a includes a navigation system 905 with a query manager 300 and a per-lane route manager 400. Also shown in FIG. 9, is an example where query source 140b includes provider 910. Provider 910 may also have a query manager 300 and a per-lane route manager 400. Navigation system 905, in some embodiments, may be located at, with or in a vehicle for which a query is being placed. Provider 910, in some embodiments, may be located remotely to a vehicle for which a query is being placed (e.g. a provider of a navigation service).

In some examples, query manager 300 includes logic (e.g. query logic 310 and/or control logic 320) to place a query to a traffic database (e.g., traffic database 112). The query may include information to indicate a start location and an end location for a vehicle to travel. The query may also include an indication of a vehicle type. As mentioned above, the traffic database may include traffic lane characteristics associated with a route between the start location and the end location (e.g., table 600). A traffic flow model (e.g., traffic flow model 700) may be generated based on the query and the traffic lane characteristics. The traffic flow model may provide traffic flow information for the route between the start location and the end location.

Per-lane route manager 400, in some embodiments, may include logic (e.g., route logic 410 and/or control logic 420). Responsive to receiving the traffic flow information, per-lane route manager 400's logic may be configured to determine a per-lane route including a path for the vehicle to travel and may present or provide an indication of the per-lane route to an occupant of the vehicle.

In some embodiments, per-lane route manager 400 may be located with the vehicle resident in navigation system 905. In these embodiments, per-lane route manager 400 may be configured to present the per-lane route to the occupant through navigation system 905. Presentation may include turn-by-turn voice guidance and/or providing an indication of the per-lane route for eventual display to the occupant.

In other embodiments, per-lane route manager 400 may be located remotely to the vehicle in provider 910. In these other embodiments, per-lane route manager 400 may be configured to remotely present the per-lane route to the occupant through provider 910 via a wired or wireless communication medium coupled to a network. Remote presentation may include transmitting turn-by-turn voice guidance or may include transmitting data associated with the per-lane route for eventual display of the per-lane route by a display system located at, with or in the vehicle.

Figure 10:
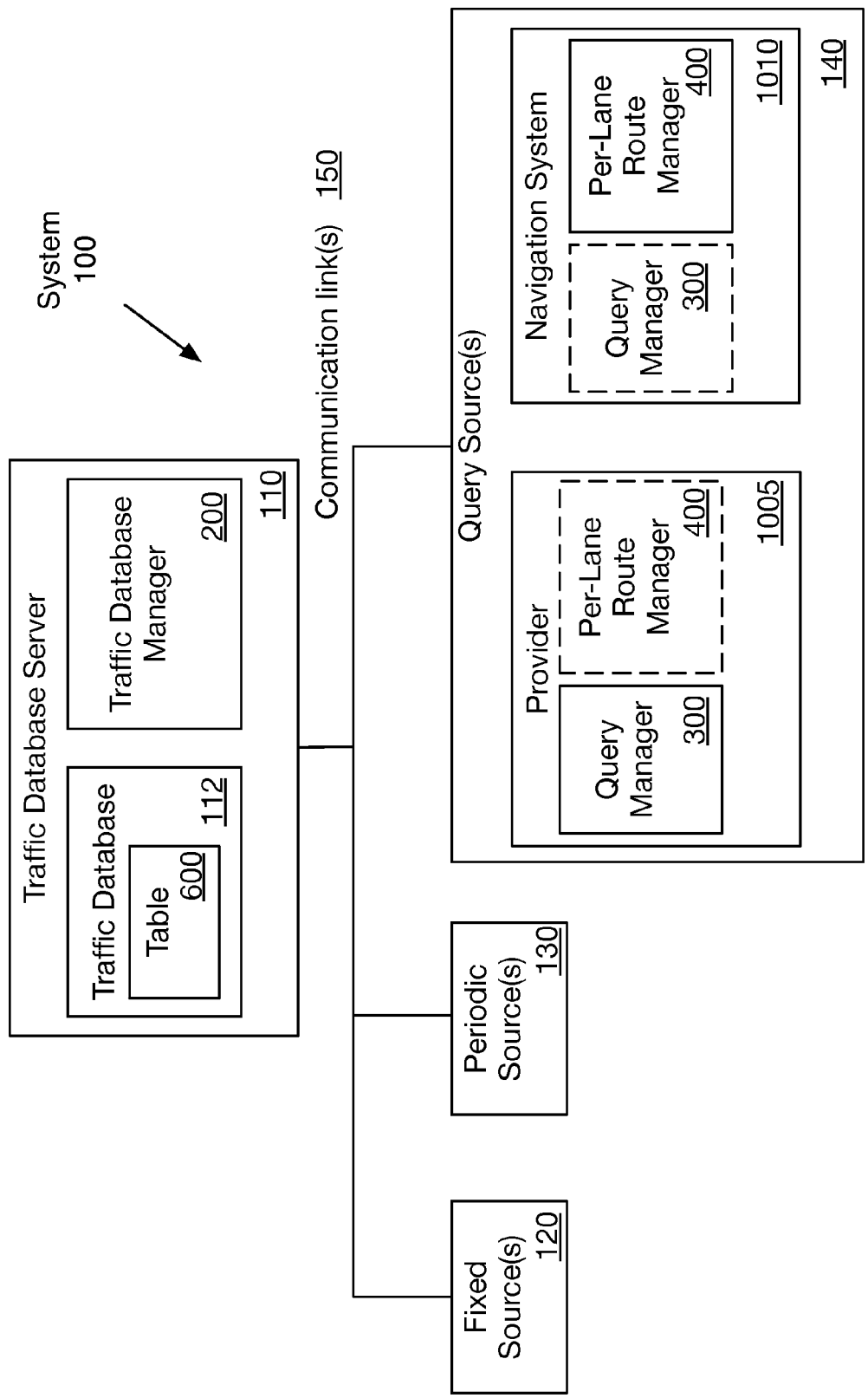
FIG. 10 illustrates another block diagram illustrating additional aspects of the example traffic flow information system.

FIG. 10 illustrates another block diagram illustrating additional aspects of the example traffic flow information system 100. System 100 as shown in FIG. 10, for example, provides more detail of query source(s) 140. In some examples, query source(s) 140 includes a provider 1005 and a navigation system 1010. Provider 1005 may be located remotely to a vehicle for which a query is being placed (e.g. a provider of a navigation service). Navigation system 1010, may be located at, with or in a vehicle for which a query is being placed. Provider 1005 and navigation system 1010 may be either one query source or can be two separate query sources.

In some embodiments, provider 1005 includes a query manager 300 and may also include a per-lane route manager 400. Navigation system 1010 may include a per-lane route manager 400 and may also include a query manager 300. As depicted in FIG. 10, the dotted-box around per-lane route manager 400 in provider 1005 and around query manager 300 in navigation system 1010 may indicate that query manager 300 and per-lane route manager 400 may be co-located either with provider 1005 or with navigation system 1010. The dotted-box may also indicate that query manager 300 can be located with provider 1005 and per-lane route manager 400 can be located with navigation system 1010. Thus, for example, logic included in query manager 300 configured to place a query, and logic included in per-lane route manger 400 configured to determine a per-lane route and present the per-lane route may be located with provider 1005, navigation system 1010 or a combination thereof.

FIG. 11 illustrates a block diagram of an example computer program product 1100. In some embodiments, as shown in FIG. 11, computer program product 1100 includes a signal bearing medium 1102 that may also include instructions 1104. In some examples, instructions 1104, which when executed by a computer, cause the computer to query a traffic database. The query may include providing information to include an indication of a start location and an end location for a vehicle to travel and an indication of a vehicle type. The traffic database may include traffic lane characteristics associated with a route between the start location and the end location. Traffic flow information may then be received from the traffic database. The traffic flow information may have been generated by the traffic database responsive to the database query using a traffic flow model, and the traffic lane characteristics to provide traffic flow information for the route between the start location and the end location. Instructions 1104 may further cause the computer to determine a per-lane route for the vehicle to travel in response to receiving the traffic flow information. Instruction 1104 may also cause the computer to present the per-lane route for the vehicle to travel to an occupant of the vehicle.

Also depicted in FIG. 11, in some embodiments, are computer readable medium 1106, recordable medium 1108 and communications medium 1110. The dotted boxes around these elements may depict different types of mediums included within, but not limited to, signal bearing medium 1102. These types of mediums may distribute instruction 1104 to be executed by a computer. Computer readable medium 1106 and recordable medium 1108, for example, may include, but are not limited to, a flexible disk, a hard disk drive, a Compact Disc (CD), a Digital Video Disk (DVD), a digital tape, a computer memory, etc. Communications medium 1110, for example, may include, but is not limited to, a digital and/or an analog communication medium (e.g., a fiber optic cable, a waveguide, a wired communication link, a wireless communication link, etc.).

Figure 12:
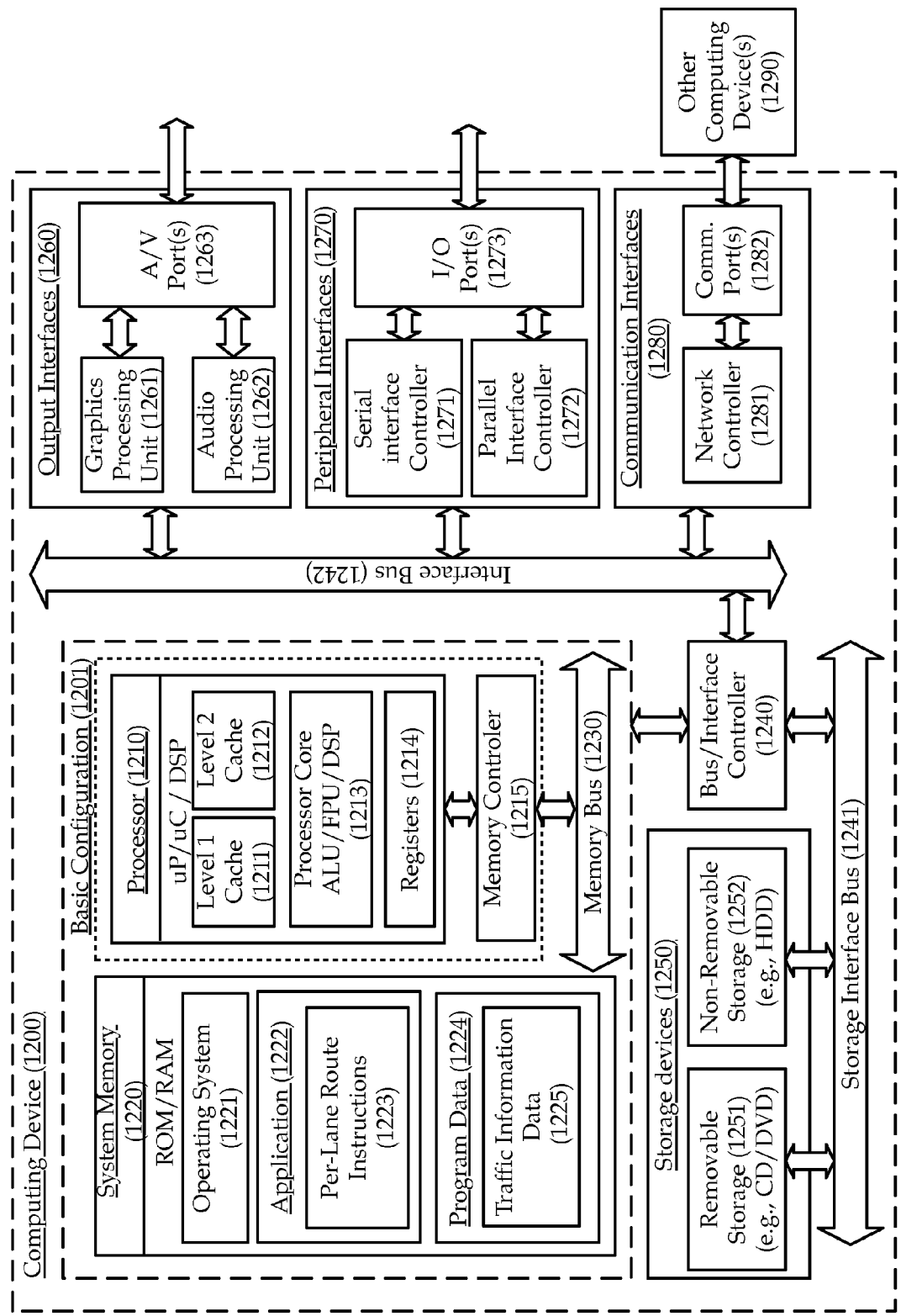
FIG. 12 illustrates an example computing device, all arranged in accordance with the present disclosure.

FIG. 12 is a block diagram illustrating an example computing device 1200. In some examples, traffic database manager 200, query manager 300 and/or per-lane route manager 400 depicted in FIGS. 2-4 may be implemented on computing device 1200. In these examples, elements of computing device 1200 may be arranged or configured to maintain and/or query a traffic database, generate a traffic flow model, provide traffic flow information, determine a per-lane and/or provide the per-lane route for a vehicle to travel. In a very basic configuration 1201, computing device 1200 typically includes one or more processors 1210 and system memory 1220. A memory bus 1230 can be used for communicating between the processor 1210 and the system memory 1220.

Depending on the desired configuration, processor 1210 can be of any type including but not limited to a microprocessor (μP), a microcontroller (μC), a digital signal processor (DSP), or any combination thereof. Processor 1210 can include one more levels of caching, such as a level one cache 1211 and a level two cache 1212, a processor core 1213, and registers 1214. The processor core 1213 can include an arithmetic logic unit (ALU), a floating point unit (FPU), a digital signal processing core (DSP Core), or any combination thereof. A memory controller 1215 can also be used with the processor 1210, or in some implementations the memory controller 1215 can be an internal part of the processor 1210.

Depending on the desired configuration, the system memory 1220 can be of any type including but not limited to volatile memory (such as RAM), non-volatile memory (such as ROM, flash memory, etc.) or any combination thereof. System memory 1220 typically includes an operating system 1221, one or more applications 1222, and program data 1224. Application 1222 includes instructions 1223 that are arranged to perform the functions as described herein including the actions described with respect to traffic database manager 200, query manager 300 or per-lane route manager 400 architectures shown in FIGS. 2-4 or including the actions described with respect to the flow charts shown in FIG. 8. Program Data 1224 includes traffic information data 1225 that is useful for implementing per-lane route instructions 1223 (e.g., query information, traffic lane characteristics, etc.). In some examples, application 1222 can be arranged to operate with program data 1224 on an operating system 1221 such that implementations of maintaining and/or querying a traffic database, generating a traffic flow model, providing traffic flow information, determining a per-lane and providing the per-lane route for a vehicle to travel may be provided as described herein. This described basic configuration is illustrated in FIG. 12 by those components within dashed line 1201.

Computing device 1200 can have additional features or functionality, and additional interfaces to facilitate communications between the basic configuration 1201 and any required devices and interfaces. For example, a bus/interface controller 1240 can be used to facilitate communications between the basic configuration 1201 and one or more data storage devices 1250 via a storage interface bus 1241. The data storage devices 1250 can be removable storage devices 1251, non-removable storage devices 1252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1220, removable storage 1251 and non-removable storage 1252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media can be part of device 1200.

Computing device 1200 can also include an interface bus 1242 for facilitating communication from various interface devices (e.g., output interfaces, peripheral interfaces, and communication interfaces) to the basic configuration 1201 via the bus/interface controller 1240. Example output interfaces 1260 include a graphics processing unit 1261 and an audio processing unit 1262, which can be configured to communicate to various external devices such as a display or speakers via one or more A/V ports 1263. Example peripheral interfaces 1260 include a serial interface controller 1271 or a parallel interface controller 1272, which can be configured to communicate with external devices such as input devices (e.g., keyboard, mouse, pen, voice input device, touch input device, etc.) or other peripheral devices (e.g., printer, scanner, etc.) via one or more I/O ports 1273. An example communication interface 1280 includes a network controller 1281, which can be arranged to facilitate communications with one or more other computing devices 1290 over a network communication via one or more communication ports 1282. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1200 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 1200 can also be implemented as a personal computer including both laptop computer and non-laptop computer configurations or implemented in a workstation or a server configuration.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method for presenting a per-lane route for a vehicle to travel comprising:

entering by at least one computing device a route between a start location and an end location;

querying by the at least one computing device a traffic database with a database query, wherein the traffic database includes traffic lane characteristics associated with the route between the start location and the end location, wherein the database query indicates the start location and the end location for the vehicle to travel and also indicates a vehicle type and indicates at least one of: if the vehicle contains or will contain a driver and one or more passengers; a vehicle capability; and a special allowance for the given vehicle;

generating traffic flow information by the at least one computing device using an algorithm, inputs to the traffic flow algorithm including at least a portion of traffic lane characteristics and at least a portion of the query information;

receiving traffic flow information from the traffic database by the at least one computing device;

determining by the at least one computing device per-lane route for the vehicle to travel in response to receiving the traffic flow information; and presenting the per-lane route for the vehicle to travel.

2. The method according to claim 1, wherein the start location and the end location for the vehicle to travel comprises at least a portion of a road segment, the road segment including one or more traffic lanes.

3. The method according to claim 1, wherein the traffic lane characteristics comprise one or more of a speed limit, a time restriction, a height limit, a weight limit, a low emission limit, a vehicle action limit and a passing restriction.

4. The method according to claim 1, wherein the traffic database comprises one or more of periodically updated information and substantially fixed information, the substantially fixed information and the periodically updated information maintained for the one or more traffic lanes included in the road segment.

5. The method according to claim 4, wherein the substantially fixed information includes traffic lane restriction information and the periodically updated information includes information from at least one of a road sensor, a traffic lane alert report, traffic flow data reported from a vehicle that has traveled over the one or more traffic lanes, traffic flow data reported from a vehicle that is traveling over the one or more traffic lanes or a transition point delay time.

6. The method according to claim 5, wherein the traffic lane restriction information for the one or more traffic lanes comprises the traffic lane restriction information to include at least one of a high occupancy vehicle (HOV) traffic lane, a speed limit, a height limit, a weight limit, a hazardous cargo prohibition, a seasonal closure, a noise limit or a tire-traction requirement.

7. The method according to claim 5, wherein the traffic database is further arranged to provide the traffic flow information for the route between the start location and the end location by providing traffic flow information that includes an indication if the vehicle is restricted from traveling in a traffic lane from among the one or more traffic lanes.

8. The method according to claim 2, wherein determining the per-lane route for the vehicle to travel comprises determining the per-lane route based, at least in part, on the fastest travel time over one or more given traffic lanes from among the one or more traffic lanes.

9. The method according to claim 5, wherein, the traffic database is further arranged to provide traffic flow information for the route between the start location and the end location by providing traffic flow information for the one or more traffic lanes that includes at least one of an indication of travel speeds obtained from the road sensor, an indication of a traffic lane alert from the traffic lane alert report, an indication of a travel speed from the traffic flow data reported from the vehicle that has traveled over the one or more traffic lanes, an indication of a travel speed from the traffic flow data reported from a vehicle that is traveling over the one or more traffic lanes, an indication of a transition point delay time or an indication of estimated total travel time through a traffic lane from among the one or more traffic lanes.

10. The method according to claim 1, wherein the data base query further comprises an indication of a time of the query.

11. The method according to claim 1, wherein the vehicle capability includes at least one of height clearance, turning radius, four-wheel drive or tire-traction capable.

12. The method according to claim 1, wherein the special allowance includes at least one of a low emission vehicle, an alternative fuel vehicle or a vehicle transporting hazardous cargo.

13. The method according to claim 1, wherein presenting the per-lane route for the vehicle to travel comprises presenting the per-lane route to a navigation system located with the vehicle and the navigation system to display the per-lane route.

14. The method according to claim 1, wherein determining by the computing device located with the query source the per-lane route for the vehicle to travel comprises the computing device determining the per-lane route for the vehicle to travel with a provider of a navigation service, wherein the provider is also configured to present the determined per-lane route for the vehicle to travel via turn-by-turn verbal guidance.

15. A traffic routing apparatus to provide a per-lane route for a vehicle to travel comprising:

a query manager including logic to send a query to a traffic database, the query to include information to indicate a start location and an end location for the vehicle to travel, an indication of a vehicle type, and an indication of at least one of: if the vehicle contains or will contain a driver and one or more passengers; a vehicle capability; and a special allowance for the given vehicle, the traffic database to include traffic lane characteristics associated with a route between the start location and the end location; and the query manager also including logic to receive a reply from the traffic database, wherein the reply includes traffic flow information based on a traffic flow model generated by an algorithm that employs at least one computing device, at least a portion of the query information and at least a portion of the traffic lane characteristics to generate the traffic flow information for the route between the start location and the end location; and a per-lane route manager including logic to determine a per-lane route for the vehicle to travel in response to traffic flow information received from the reply and also including logic to present the per-lane route for the vehicle to travel.

16. The traffic routing apparatus according to claim 15, wherein the start location and the end location for the vehicle to travel comprises at least a portion of a road segment, the road segment including one or more traffic lanes.

17. The traffic routing apparatus according to claim 15, wherein the traffic lane characteristics comprise one or more of a speed limit, a time restriction, a height limit, a weight limit, a low emission limit, a vehicle action limit and a passing restriction.

18. The traffic routing apparatus according to claim 17, wherein the logic for the per-lane route manager to determine the per-lane route for the vehicle to travel comprises logic configured to determine the per-lane route based, at least in part, on the fastest travel time over one or more given traffic lanes from among the one or more traffic lanes.

19. The traffic routing apparatus according to claim 15, wherein the query manager and the per-lane route manager comprises the query manager and the per-lane route manager resident in a navigation system located with the vehicle.

20. A system to provide a per-lane route for a given vehicle to travel comprising:

a query manager including logic to send a query, the query to include information to indicate a start location and an end location for the given vehicle to travel, an indication of a vehicle type for the given vehicle, and an indication of at least one of: if the vehicle contains or will contain a driver and one or more passengers; a vehicle capability; and a special allowance for the given vehicle, the query manager also including logic to receive a reply to the query, wherein the reply includes traffic lane characteristics associated with a route between the start location and the end location responsive to the query;

a traffic database manager including logic to receive the query and generate the reply to the query using a traffic database, wherein the traffic database includes traffic lane characteristics associated with one or more routes for a vehicle to travel, the traffic lane characteristics to be based on one or more of substantially fixed information and periodically updated information, wherein the logic of the traffic database manager is arranged to generate the reply to the query by applying a traffic flow model using an algorithm and at least one computing device to at least a portion of the query information and at least a portion of the traffic lane characteristics associated with a route between the start location and the end location to generate traffic flow information for the route between the start location and the end location; and a per-lane route manager including logic to determine a per-lane route for the given vehicle to travel in response to receiving the traffic flow information and to provide the per-lane route for the given vehicle to travel.

21. The system according to claim 20, wherein the route between the start location and the end location comprises at least a portion of a road segment, the road segment including one or more traffic lanes.

22. The system according to claim 20, wherein the traffic lane characteristics comprise one or more of a speed limit, a time restriction, a height limit, a weight limit, a low emission limit, a vehicle action limit and a passing restriction.

23. The system according to claim 20, wherein the logic for the per-lane route manager to determine the per-lane route for the given vehicle to travel comprises logic configured to determine the per-lane route based, at least in part, on the fastest travel time over one or more given traffic lanes from among the one or more traffic lanes.

24. The system according to claim 20, wherein the query manager and the per-lane route manager comprises the query manager and per-lane route manager resident in a navigation system located with the given vehicle.

25. The system according to claim 20, wherein the query manager and the per-lane route manager are both included in a provider of a navigation service, wherein the provider of the navigation service is further configured to present the per-lane route for the given vehicle to travel.

26. The system according to claim 25, wherein to present the per-lane route comprises turn-by-turn verbal guidance via an audio output located with the given vehicle.

27. The system according to claim 20, wherein the substantially fixed information include traffic lane restriction data, and wherein the periodically updated information includes data from a road sensor.

28. The system according to claim 27, wherein the traffic lane restriction data comprises the traffic lane restriction data to include at least one of a high occupancy vehicle (HOV) traffic lane, a speed limit, a height limit, a weight limit, a hazardous cargo prohibition, a seasonal closure, a noise limit or a tire-traction requirement.

29. A computer program product comprising a non-transitory signal bearing medium having instructions for presenting a per-lane route for a vehicle to travel, which, when executed by a computer, causes the computer to:

query a traffic database with a database query, wherein the database query identifies an indication of a start location and an end location for the vehicle to travel, an indication of a vehicle type, and an indication of at least one of: if the vehicle contains or will contain a driver and one or more passengers; a vehicle capability; and a special allowance for the given vehicle, wherein the traffic database is to include traffic lane characteristics associated with a route between the start location and the end location;

receive traffic flow information from the traffic database, wherein the traffic flow information is generated by the traffic database responsive to the database query using a traffic flow model, a traffic flow algorithm, at least a portion of the query information, at least a portion of the traffic lane characteristics and at least one computing device to provide the traffic flow information for the route between the start location and the end location;

determine a per-lane route for the vehicle to travel in response to receiving the traffic flow information; and present the per-lane route for the vehicle to travel.

30. The computer program product according to claim 29, wherein the start location and the end location for the vehicle to travel comprises at least a portion of a road segment, the road segment including one or more traffic lanes.

31. The computer program product according to claim 30, wherein to determine the per-lane route for the vehicle to travel comprises to determine the per-lane route based, at least in part, on the fastest travel time over one or more given traffic lanes from among the one or more traffic lanes.

* * * * *

UNITED STATES PATENT AND TRADEMARK OFFICE
CERTIFICATE OF CORRECTION

PATENT NO. : 8,838,370 B2
APPLICATION NO. : 12/400631
DATED : September 16, 2014
INVENTOR(S) : Wolfe Page 1 of 1

It is certified that error appears in the above-identified patent and that said Letters Patent is hereby corrected as shown below:

In the Drawings:

In Fig. 12, Sheet 12 of 12, delete "uP/uC/DSP" and insert -- µP/µC/DSP --, therefor.

In Fig. 12, Sheet 12 of 12, in Box "(1215)", in Line 1, delete "Memory Controler" and insert -- Memory Controller --, therefor.

In the Specification:

In Column 1, Lines 56-57, delete "system; and" and insert -- system; --, therefor.

In Column 1, Line 59, delete "product" and insert -- product; and --, therefor.

In Column 10, Line 2, delete "cros" and insert -- cross --, therefor.

In the Claims:

In Column 19, Line 8, in Claim 1, delete "device" and insert -- device a --, therefor.

Signed and Sealed this
Twenty-fourth Day of March, 2015

Michelle K. Lee
*Director of the United States Patent and Trademark Office*